US00RE34525E

United States Patent [19]

Lazzaroni et al.

[11] E Patent Number: Re. 34,525

[45] Reissued Date of Patent: Feb. 1, 1994

[54] MOTORCYCLE HELMET MICROPHONE MOUNT AND PLUG MOUNT

[76] Inventors: John J. Lazzaroni; Melinda K. Lazzaroni, both of 7322 E. Stella Rd., Tucson, Ariz. 85730

[21] Appl. No.: 784,070

[22] Filed: Oct. 30, 1991

Related U.S. Patent Documents

Reissue of:

[64] Patent No.: 4,788,724
Issued: Dec. 6, 1988
Appl. No.: 66,130
Filed: Jun. 24, 1987

U.S. Applications:

[63] Continuation of Ser. No. 485,901, Jan. 25, 1990, abandoned.

[51] Int. Cl.[5] ..... A42B 1/24

[52] U.S. Cl. ..... 2/422; 379/430; 381/187; 455/89; 455/351

[58] Field of Search ..... 2/10, 422, 6, 209.1; 24/335; 248/72, 231.6; 379/430; 381/187; 455/89, 351

[56] References Cited

U.S. PATENT DOCUMENTS

| | | | |
|---|---|---|---|
| Re. 7,544 | 3/1877 | Boudren | 248/231.6 |
| 277,734 | 5/1883 | Hudson | 24/335 X |
| 1,085,916 | 2/1914 | Hutchison | 379/430 X |
| 1,150,046 | 8/1915 | Lloyd | 24/335 X |
| 2,385,209 | 9/1945 | Joyce | 248/72 |
| 2,862,071 | 11/1958 | Bonnaffous | 381/187 X |
| 3,258,534 | 6/1966 | Goldsworthy | 2/422 X |
| 3,586,977 | 6/1971 | Lustig | 455/89 |
| 3,916,312 | 10/1975 | Campbell | 455/351 |
| 4,040,547 | 8/1977 | Dickey | 381/187 X |
| 4,097,169 | 6/1978 | Kelly | 24/335 X |
| 4,424,880 | 1/1984 | Murayama et al. | 2/422 X |
| 4,620,605 | 11/1986 | Gore et al. | 381/187 X |
| 4,833,726 | 5/1989 | Shinoda et al. | 455/89 |

FOREIGN PATENT DOCUMENTS

| | | | |
|---|---|---|---|
| 1953337 | 9/1971 | Fed. Rep. of Germany | 381/187 |
| 2921434 | 11/1980 | Fed. Rep. of Germany | 381/187 |
| 61-261543 | 11/1986 | Japan | 248/231.6 |
| 2005958 | 4/1979 | United Kingdom | 381/187 |

*Primary Examiner*—Clifford D. Crowder
*Assistant Examiner*—Michael A. Neas
*Attorney, Agent, or Firm*—Cahill, Sutton & Thomas

[57] ABSTRACT

A microphone mount and plug mount for attaching to the side of a motorcyclist's helmet, said microphone mount adapted to secure a microphone boom positioning a microphone proximate t ıe motorcyclist's mouth, the motorcycle mount characterized by a clamp portion adapted to forcefully engage the bottom edge of the helmet with minimum structure below the edge of the helmet, and a boom seat to receive the boom base and passage of electrical wires from the microphone mount. The plug mount defines a clamp portion similarly adapted to surround the lower edge of the helmet, and a plug seat defining a cavity adapted to receive a electrical plug and an opening to said plug seat cavity to receive electrical wires from said microphone mount and from a headset mounted interiorly to said helmet, the electrical plug receiving a mating electrical plug attached to wires connecting with audio accessories located on said motorcycle.

17 Claims, 2 Drawing Sheets

MOTORCYCLE HELMET MICROPHONE MOUNT AND PLUG MOUNT

Matter enclosed in heavy brackets [ ] appears in the original patent but forms no part of this reissue specification; matter printed in italics indicates the additions made by reissue.

*This application is a continuation of reissue application Ser. No. 07/485,901, filed on Jan. 25, 1990 now abandoned.*

BACKGROUND OF THE INVENTION

1. Field of the Invention

The field of the invention is accessories attaching to motorcyclist's helmet for securing a microphone proximate the rider's mouth.

2. Description of the Related Art

With the advent of accessories for motorcyclists, particularly in the field of supplying audio sounds to a rider, such as a radio receiver output, has come the inevitable desire for the motorcycle rider to communicate, both with a passenger who may be riding with the motorcyclist, and with other parties remote from the motorcycle. Since most motorcyclists have adopted the wearing of helmets, it is only natural that the accessories necessary for bringing audio sound to the rider, and taking the sound away from the rider should be connected with the helmet. Accordingly, motorcycle helmets may now be fitted interiorly with padding and with a headset or earphones for hearing the audio sounds. Because the helmet so encompasses the head of the motorcycle rider for safety purposes, it also provides a relatively quiet sound environment which makes possible quite good audio hearing, although, the helmets are designed so that sounds louder than the environment are also heard, such as sirens from emergency vehicles or other warning sounds.

In the past, fixtures attaching to helmets have been constructed to place a microphone at the end of a boom in front of the motorcycle rider's mouth, the other end of the boom attaching to the fixture. Full face helmets, i.e., those helmets which are constructed such as to completely surround the head, having an opening in the helmet through which one's head is inserted and an opening for viewing, do not utilize a microphone located on the end of a boom since the microphone may be mounted in that portion of the helmet immediately forward of the face. However, in ¾ face helmet, the helmet does not surround completely the head, but the opening through which the person places their head into the helmet is connected with the opening for viewing and thus there is no portion of the helmet immediately forward of the rider's face. The ¾ face helmets thus do require the microphone with the attached boom in order to place the microphone immediately forward of the rider's mouth.

In the prior art, mounting fixtures and accessories for attachment to a helmet have been developed which do secure a microphone boom in front of the rider's mouth, however, these microphone mounts suffer from a number of deficiencies. Firstly, some helmet microphone mounts are attached to the side of the helmet by drilling holes through the mount and through the helmet and then securing the mount to the helmet by means of rivets, bolts, nuts, or possibly a threaded plate. This method makes for a satisfactory, well secured mount, however, it suffers from the most obvious shortcoming that the helmet has been modified by having to drill holes through it, and should the microphone mount ever be removed, one or more unsightly holes will have been left in the helmet.

Other microphone mounts in the prior art clamp to the lower edge of the motorcycle helmet, however, they are so constructed that they extend substantially below the lower edge of the helmet such that when they are installed upon the helmet and the rider wearing the helmet turns his head from side to side, the microphone mount may strike the rider's shoulder which in turn causes discomfort and is a constant source of aggravation. This is especially a problem when the electrical wires, which run from the motorcycle frame to the microphone mount, attach by means of a plug mounted to the microphone mount such as to enlarge the portion of the mount residing below the helmet lip and present a still larger object for striking the helmet wearer's shoulder when his head turns.

Thus, it is obvious that there is need for helmet microphone mounting accessories which overcomes the problems of defacing the helmet at the point where the mount is attached to the helmet, and avoiding the problem of having the clamp residing substantially below the lip of the helmet so as to interfere with the comfort of the helmeted person when such person turns their head.

These and other object needs are set out in the enclosed specification of Applicant's invention.

SUMMARY OF THE INVENTION

The embodiment of the invention described consists of accessories or fixtures attachable to a helmet worn by a motorcyclist or other party which will support a microphone immediately in front of the helmet wearer's mount and which provides for connection of an electrical plug which receives the electrical wires from the electronic audio sound apparatus mounted on the motorcycle such as a radio receiver, two-way radio, or stereo music player, as well as providing connection for the wires to the microphone and earphones being worn while avoiding the modification and personal discomfort shortcomings previously discussed.

Specifically, the subject invention provides a microphone mount and a plug mount, the microphone mount consisting of a clamping mechanism adapted to surround the lower edge of the helmet proximate the face opening, to adjustably compress the lower edge of the helmet being two jaws, and means for securing one end of a boom having a microphone attached at the other end while also providing for an easy exit from the mount of the electrical wires which attach to the microphone and run through the boom. In the microphone mount, an open-ended barrel shaped elongated boom seat having a removable semi-circular top cap receives and secures the microphone boom base, the seat's open end receiving the boom, and a small opening at the other end to allow passage of electrical wires out of the seat. Once the base end of the microphone boom is installed interiorly to the seat with its electrical wire protruding through the small opening in the end, the top cap is then reinstalled and all parts held together with a proper adhesive.

The clamp portion of the microphone mount comprises an elongated inside and outside jaw with a arcuate shaped concavity formed in each jaw to form somewhat an elliptical figure with a pair of crosswise gripping ridges set in the surface of each jaw. Both inside and outside jaw are pivoted together by means of a pair of machine screws and nuts which pass through both jaws immediately adjacent to one end of the clamp.

The microphone mount is installed surrounding the lower edge of the helmet in a clamping arrangement with only that portion of the jaws having the two holding machine screws and nuts extending below the bottom edge of the helmet. The clamp is secured against the inside and outside surface at the lower edge of the helmet by means of tightening the pair of machine screws and nuts and causing the respective jaws to close. The jaws come against the helmet from the inside and the outside, securing it in place by forcibly contacting the helmet at an upper lip and at the two pairs of gripping ridges.

Situated adjacent to the microphone mount at the bottom edge of the helmet is a similarly constructed plug mount which utilizes the identical jaw structure to grip the outside and inside surfaces adjacent the bottom edge of the helmet, including utilization of the same holding machine screws and nuts, and provides a plug seat to secure a female electrical plug while also providing a wire outlet opening from the plug seat for wires which run to the microphone mount and to the earphones or headset mounted interiorly to the helmet. The female plug which is held in the plug seat is adapted to receive a male plug at the end of the electrical wires which connect to the electronic audio equipment attached to the motorcycle frame.

Both the microphone mount and the plug mount are constructed such that the microphone boom seat and the plug seat are attached to the portion of the jaw on the outside of the helmet and opposite the end of the portion of the jaws having the machine screws and nuts, and thus above the lower lip of the helmet when the mounts are attached to the helmet. By this construction, only a minimum amount of the microphone mount and plug mount reside below the lip of the helmet and consequently, when the helmet wearer turns his head, the mounts do not intersect the person's shoulder and the aggravation and discomfort previously described is avoided.

Accordingly, it is an object of the subject invention to provide a helmet microphone mount not requiring mechanical fastenings protruding through the body of the helmet, but in fact securing proximate the lower edge of the helmet.

It is another object of the subject invention to provide a motorcycle mount and plug mount which have a minimum portion of the mount extending below the lower edge of the helmet.

It is still a further object of the subject invention to provide a microphone mount and a plug mount wherein the seats receiving the microphone boom and the plug are situated above the lower edge of the helmet when the microphone mount and plug mount are attached to a helmet.

Other objects of the invention will in part be obvious and will in part appear hereinafter. The invention accordingly comprises the apparatus possessing the construction, combination of elements, and arrangement of parts which are exemplified in the following detailed disclosure and the scope of the Application of which will be indicated in the claims.

BRIEF DESCRIPTION OF THE DRAWINGS

For further understanding of the features and objects of the subject invention, reference should be had to the following detailed description taken in connection with the accompanying drawings wherein.

In various views, like index numbers refer to like elements.

DETAILED DESCRIPTION OF THE PREFERRED EMBODIMENT

Figure 1:
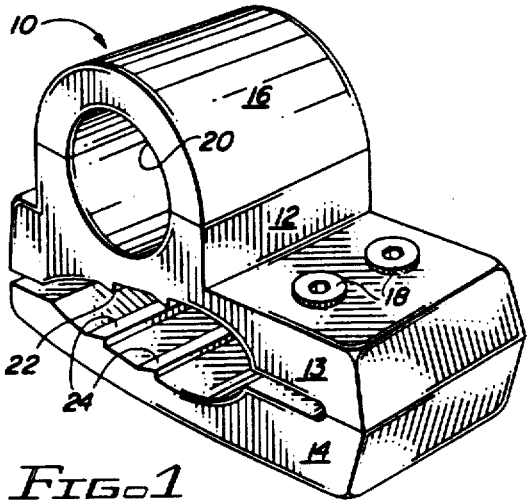
FIG. 1 is a perspective view of the subject inventive microphone mount.
Figure 3:
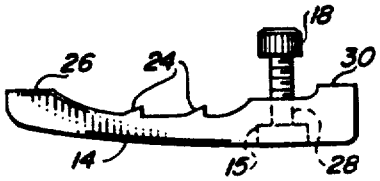
FIG. 3 is a side view of the inside jaw.

Referring now to FIG. 1, a perspective view of the motorcycle helmet microphone mount 10 is shown. Microphone mount 10 comprises two primary components, namely the clamp portion and microphone boom seat, the clamp portion consisting of elongated inside or lower jaw 14 and outside or upper jaw 13, and with microphone boom seat 12 attached to the upper jaw 13. The microphone boom seat is capped with a removable top cap 16. The lower jaw 14 is held to the upper jaw 13 by means of the pair of machine bolts 18, the heads of which are shown in counter-sunk recesses formed in upper jaw 3. Machine bolts 18 extend through holes formed in both upper jaw 13 and lower jaw 14 and have receiving nuts (not shown) which also reside in a counter-sunk recess in the bottom surface of lower jaw 14 (FIG. 3). Characteristically, the head of the machine bolts 18 shown in FIG. 1 are round and have a opening in the top face to receive a hex wrench. The counter-sunk recess on the bottom of lower jaw 14 is hexagonal in shape to receive the hexagonal nut and is of such a size tolerance that the nut, once in the recess, is restrained from rotating.

Figure 4:
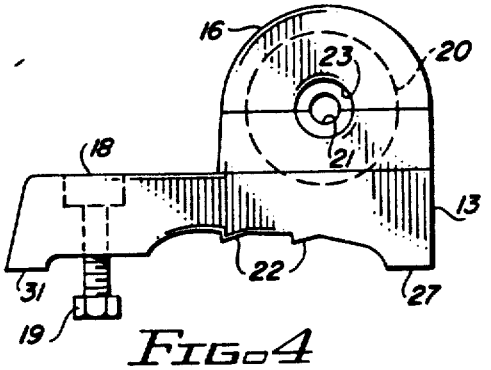
FIG. 4 is a side view of the outside jaw and microphone boom seat.

Also shown in FIG. 1 is the opening 20 leading into a barrel shaped elongated cavity formed in microphone boom seat 12 and top cap 16. This cavity comprises the seat securing the base end of the microphone boom which extends the microphone to a position proximate the motorcyclist's mouth as shown in FIG. 13. Top cap 16 is a removable cap forming the upper portion of the seat and is sealed in place to the microphone boom seat 12 after the base of the microphone boom has been placed in the cavity. Nominally an adhesive is utilized to accomplish the seal. The microphone boom then will extend outward of the boom seat when installed, passing through opening 20. As will be explained in further detail in connection with FIGS. 12 and 13, motorcycle helmet microphone mount 10 is adapted to surround the lower edge of a motorcyclist's helmet in a clamping configuration to secure the boom of the motorcycle rider's microphone. Extending through the opposite end of the barrel shaped cavity formed by the microphone boom seat is a second opening much smaller than opening 20 but which allows passage of an electrical wire which transmits the electrical signals produced by the microphone. This second opening, shown as numeral 21 in FIG. 4, is substantially in line with the longitudinal axis of the barrel shaped cavity.

Referring to the clamp portion, helping to secure the motorcycle microphone mount 10 to the edge of the motorcyclist's helmet are a pair of transverse gripping ridges 22 on the upper jaw 13 and a pair of transverse gripping ridges 24 on the lower jaw 4. Both pairs of these ridges run from side to side at right angles to longitudinal axis of the elongated upper and lower jaws which form the clamp surrounding the lower edge of the motorcycle helmet. The ridges are adapted to contact the sides along the edges of the helmet and help to secure the microphone mount thereto.

Figure 2:
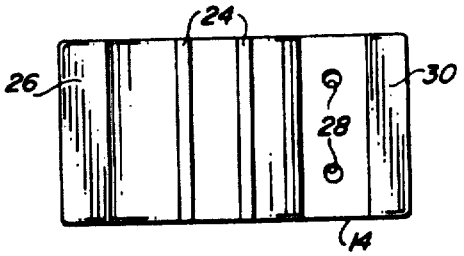
FIG. 2 is a top view of the inside jaw.

The primary component parts of microphone mount 10 are individually shown in FIGS. 2–6. FIG. 2 is a top view of lower jaw 14 rotated approximately 180 from its relative position in FIG. 1 showing the elongated rectangular configuration with the top gripping surface or lip 26, transverse gripping ridges 24 and machine bolt openings 28. Lastly is shown the fulcrum 30 which will abut a similar element in the upper jaw 13 and about which the jaws pivot. An arcuate shaped transverse concavity forming the jaw is shown running from the top gripping surface 26 to the ledge proximate machine bolt openings 28, and situated upon the bottom of the arcuate shaped concavity are the pair of gripping ridges 24. This arcuate shaped concavity is better seen in FIG. 3 where a side view of lower jaw 4 is detailed.

In FIG. 3, the arcuate shaped concavity securing portion of the lower jaw 14 with the pair of gripping ridges 24 at the bottom of the concavity is seen between the top gripping surface 26 and the ledge penetrated by machine bolt openings 28. At the far right end is shown the fulcrum 30. The counter-sunk hexagonal recess 15 adapted to receive the nut for the machine bolt 18 (shown for convenience in FIG. 3) is detailed in dotted fashion.

FIG. 4 is a side view of upper jaw 13 and microphone boom seat 2 and a top cap 16 taken from the side not visible in FIG. 1. Here is seen the opening 21 for exiting the microphone wire (not shown) and a dotted circle representing opening 20 located at the other end, both openings centrally located upon a cylindrical axis defined by the cylindrical cavity formed in the boom seat. Opening 21 is formed inside an extending boss 23, opening 21 half located in microphone boom seat and half in top cap 16. At the left hand end of upper jaw 13 is the counter-sunk recess receiving machine bolt 18 which, for convenience, has been shown extending completely through the upper jaw 13 and having located at its end nut 19. At opposite ends of upper jaw 13 is the fulcrum 31 which abuts fulcrum 30 of the lower jaw 14, and at the other end of upper jaw 13 is top gripping surface 27 which will engage the outside of the motorcycle helmet. In a mirror image of the arcuate shaped concavity formed in the lower jaw 14 is the arcuate shaped concavity formed in the upper jaw having at or near its bottom gripping ridges 22 similarly designed to forcibly engage the sides of the motorcycle helmet to help hold the microphone mount 10 to the helmet.

Figure 5:
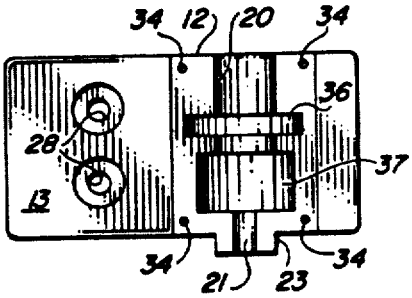
FIG. 5 is a top view of the outside jaw of the microphone mount and the microphone boom seat with its top cap removed.

FIG. 5 is a top view of the upper jaw 13 and microphone boom seat 12 absent top cap 16. Upper jaw 13 and microphone boom seat 12 in FIG. 5 is shown relatively slightly larger than its representation in FIG. 1 although consistent with the size shown in FIG. 4. Starting from the bottom, shown are the pair of circular counter-sunk recesses adapted to receive machine bolts 18 where within the center of the recesses are the machine bolt openings 28. Proceeding upward, the lower half of the cavity which forms the seat for the microphone boom is detailed, having at one end opening 20 through which the microphone boom protrudes (not shown), and at the other end opening 21 through which the microphone wires exit the boom seat cavity. The boss 23 previously mentioned in respect of FIG. 4 is also shown protruding from the side of the upper clamp portion and microphone boom seat 12. On the top of the walls of the microphone boom seat cavity are four blind holes 34 which provide alignment mechanisms for similarly located pins in top cap 16. Interiorly to the half cylindrical barrel cavity of the microphone boom seat is a circular groove 36 which operates as a securing mechanism for the cylindrical shaped microphone boom base and lastly, a second much larger circular groove 37 also adapted to secure the microphone boom base. Opening 21 penetrates to first circular groove 37.

Figure 6:
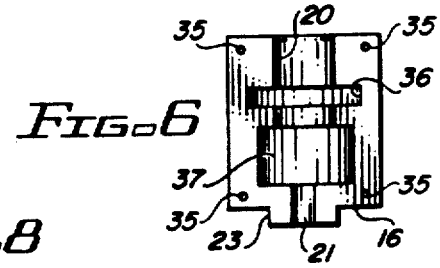
FIG. 6 is a bottom view of the top cap of the microphone boom seat of the microphone mount.

Lastly, FIG. 6 is a bottom view of semi-circular elongated top cap 16 showing the upper half of microphone boom opening 20, boss 23, and microphone wire opening 21. On opposite sides of the half round cylindrical cavity formed centrally to top cap 16 are circular grooves 36 and 37 to mate with the same circular grooves 36 and 37 in microphone boom seat 12. Also shown are alignment pins 35 which mate with alignment blind holes 34 and thereby provide correct alignment. When adhesive is placed upon the surrounding surfaces of top cap 16 and microphone boom seat 12, the microphone boom base is securely held.

Figure 7:
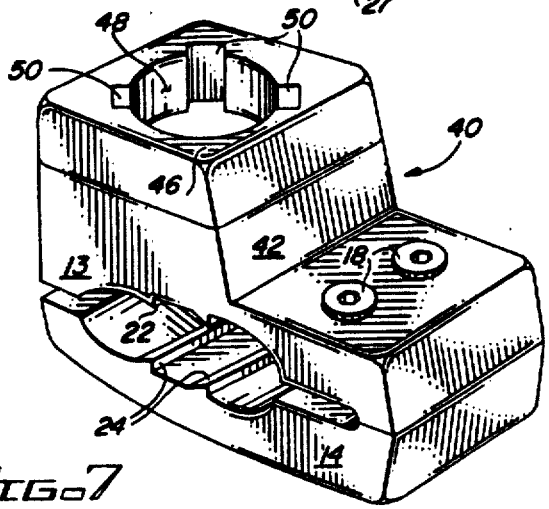
FIG. 7 is a perspective view of the plug mount.

Referring now to FIG. 7, plug mount 40 which works in conjunction with microphone mount 12 is shown in a perspective view. Similarly to microphone mount 12, plug mount 40 also comprises two major components, namely the clamp and plug seat, and has the elongated clamp, consisting of lower jaw 14 and upper jaw 13, in common with [motorcycle] *microphone* mount 10. Secured to lower jaw 14 by machine bolts 18 is the upper jaw 13 and attached plug seat 42 which, like upper jaw 13 and microphone boom seat 12 of FIG. 1, works in conjunction with lower jaw 14 to surround and securely hold to the edge of the motorcycle helmet. Lastly, situated atop plug seat 42 is top plug holder 46. All other aspects of similarity to microphone mount 10 remain the same, namely the machine bolts 18 which secure the upper jaw 3 and the lower jaw 14 together as well as the arcuate shaped concavity formed in each of the upper jaw 13 and lower jaw 14. The resultant elliptical shaped opening formed between the two pieces, like the same elliptical shaped opening cavity formed in microphone mount 10, has transverse gripping ridges 24 attached to lower jaw 14 and gripping ridges 22 attached to upper jaw 13.

Formed in the top plug holder 46 is a circular plug opening 48 which permits a female electrical plug (not shown) to reside within the opening with the face of the plug flush or nearly flush with the top surface of top plug holder 46. The vertical multiple indexing grooves 50 receive indexing tags of the female electrical plug to secure the plug in a constant orientation. Not shown in FIG. 7, but on the side of the plug opposite the left hand side shown is an opening which is partially in the top plug holder 46 and partially in the plug seat 42 which allows passage of electrical wires to the microphone mount 10. Electrical wires running from the motorcycle frame or from a radio, stereo music player, or two-way radio mounted to the motorcycle frame attach to a male plug which mates with the female plug held securely in plug opening 48.

Figure 8:
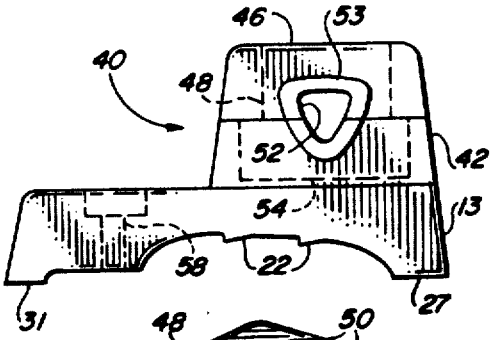
FIG. 8 is a side view of the outside jaw and plug seat of the plug mount.
Figure 9:
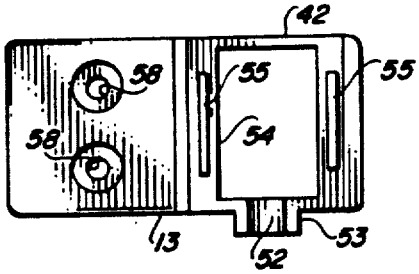
FIG. 9 is a top view of the outside jaw of the plug seat with the top cap removed.
Figure 10:
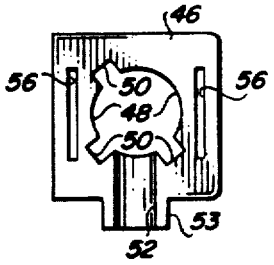
FIG. 10 is a bottom view of the top plug holder of the plug seat of the plug mount.

Components comprising plug mount 40 are shown in FIGS. 8–10, and commencing with FIG. 8 shows a side view of plug mount 40 (less lower jaw 14) from the side opposite that side illustrated in FIG. 7. Here shown residing between top plug holder 46 and plug seat 42 is wire opening 52 which, like its similar counterpart and microphone mount 10, is surrounded by boss 53 defining the interior opening 52. Wire opening 52 leads interiorly to the cavity formed interiorly to plug seat 42. The plug opening 48 shown in FIG. 7 leads into the slightly larger cavity 54 shown by the dotted line in the plug seat 42 (FIG. 8). Also shown in dotted fashion are the sides of top plug holder opening 48.

FIG. 8 also shows the features which it has in common with microphone mount 10, namely the arcuate shaped concavity along its bottom portion of upper jaw 13 which is adapted to surround the outside edge of the motorcycle helmet with protruding pointed gripping ridges 22 adapted to engage the outside of the helmet to hold plug mount 40 to the helmet. Also, the countersunk recess and machine bolt opening 58 is shown proximate the left end of the upper jaw 13. Also, similarly to the upper jaw 13 and microphone boom seat 12 of microphone mount 10, upper jaw 13 in plug mount 40 possesses the fulcrum 31 against which the lower jaw 14 engages as well as the top gripping surface 37 which is urged against the outside of the motorcycle helmet.

FIG. 9 is a top view of upper jaw 13 and plug seat 42 with top plug holder 46 removed. Here shown are the walls which constitute the cavity 54, and the wire opening 52 leading from the interior of the cavity 54 to the outside. Wire opening 52 is surrounded by boss 53. Opening 52 is located partially in top plug holder 46 and partially in plug seat 42. Additionally shown in FIG. 9 are the pair of grooves 55 formed in the side walls of plug seat 42 surrounding cavity 54 to permit alignment of the top plug holder 46. Lastly, machine bolt openings 58 are shown which allow passage of the machine bolts to hold the clamped portions together.

FIG. 10 is a bottom view of the top plug holder 46 showing firstly the circular plug opening 48, the multiple grooves 50 formed vertically in the same direction as the axial direction of plug opening 48, the wire opening 52 which top plug holder 46 shares with plug seat 42 as well as boss 53 surrounding the wire opening 52. Lastly, alignment protrusions 56 adapted to mate with alignment grooves 55 of plug seat 42 are detailed in FIG. 9. After the female plug is situated in the cavity 54 of plug seat 42, and top plug holder 46 set about it with the female electrical plug indexed properly in groove 50, and the plug wires exiting through opening 52, all parts are held together with an appropriate adhesive.

Figure 11:
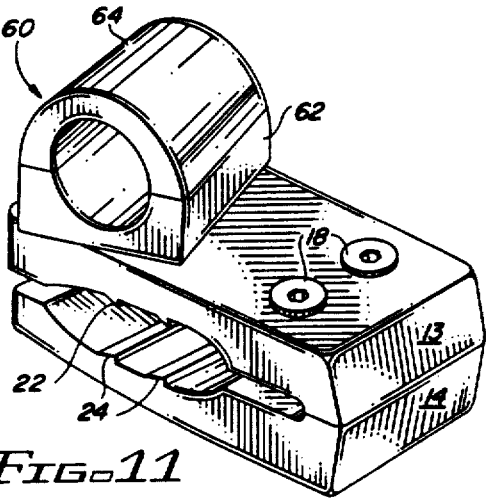
FIG. 11 is a perspective view of an alternate embodiment of the microphone mount.
Figure 13:
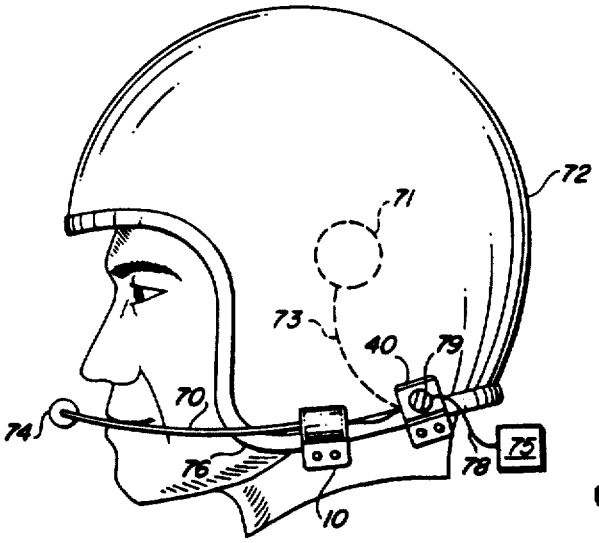
FIG. 13 is a side view of a helmeted wearer with the subject invention attached.
Figure 14:
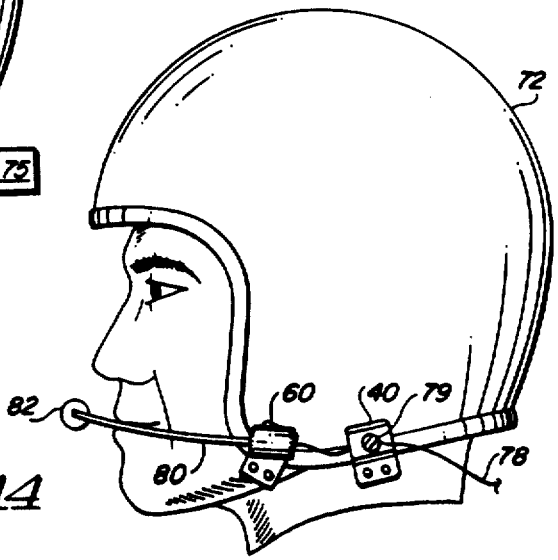
FIG. 14 is a side view of a helmeted wearer with the alternate embodiment of the invention attached.

Referring now to FIG. 11, a perspective view of an alternate microphone mount 60 is illustrated. This alternate microphone mount is adapted to secure the boom of the microphone at a different angle. In the invention, two optional microphone booms are offered. One option employs the microphone at the end of a steel flexible shaft boom where the shaft is sufficiently rigid that the microphone mount may be mounted at a point approaching approximately mid-point of the edge of the helmet between the front and the back. This option employs the preferred embodiment shown in FIG. 1. The other option is to use a flexible plastic microphone boom which is of shorter length than the flexible steel boom and as a consequence, the microphone mount must be at a point closer to the driver's mouth and thus is usually on the lip of the curve of the helmet near the point where the helmet begins opening for the face. This option employs the alternate embodiment shown in FIG. 11. These are illustrated in FIGS. 13 and 14 which will be discussed presently.

The only difference between the microphone mount 10 and the alternate microphone mount 60 of FIG. 11 is that the boom seat of the alternate embodiment, i.e., the portion which contains the cavity to receive the microphone boom base, has been placed at an angle such that the longitudinal axis of the boom seat barrel or cylindrical shaped cavity is skewed or offset from the right angle relationship with the elongated upper jaw of microphone mount 10. The lower jaw 14 and upper jaw 13 remain the same as in microphone mount 10. Microphone boom seat 62 and top cap 64 of the alternate embodiment are identical to boom seat 12 and top cap 16 of the preferred embodiment of FIG. 1 as well as the interior cavity thereto.

Figure 12:
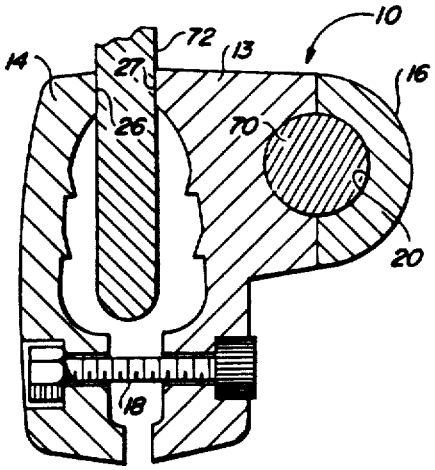
FIG. 12 is a cross-sectional view of the microphone mount attached to the lower edge of the helmet.

Referring now to FIG. 12, a cross-sectional view is shown of microphone mount 10 in place surrounding the bottom edge of a motorcyclist's helmet. For ease of illustration, the microphone mount 10 is shown not actually engaging the helmet edge, but in a position ready to engage the helmet. Lower or inside jaw 14, which resides interiorly to the helmet, is held to upper or outside jaw 13 and microphone boom seat 12 by means of machine bolts 18 shown connecting both sides. For ease of illustration, the divisional line between the top cap 16 and the microphone boom seat 12 are shown in the same cross hatch because the parts have been glued together. Shown emerging from opening 20 is a cross-sectional view of the microphone boom 70. Sandwiched between the lower jaw 14 and upper jaw 13 is the edge of the helmet 72. To clamp the helmet in the microphone mount 10, machine bolt 18 is tightened, and as it tightens, the gripping ridges on the jaws on both sides of the helmet, together with the gripping surfaces 26 and 27 of the lower jaw 14 and upper jaw 13 respectively engage the side of the helmet in a fixed securing manner.

Through the use of high strength plastic in the microphone mount, and the fact that the helmets also use high strength plastic in their construction and have a scratch resistant surface, it has been determined that Applicant's clamp may be firmly secured to the helmet, is easily removable by unscrewing the machine bolts, and leaves no scars upon the helmet by its use.

Referring now to FIGS. 13 and 14, Applicant's invention is shown in place on a motorcyclist's helmet. In FIG. 13, microphone mount 10 is shown attached to helmet 72 at a position ⅓ to ½ the distance from the front of the bottom opening to the rear and shows microphone boom 70 emerging from microphone mount 10. At the end of microphone boom 70 is wind sock 74, made of soft porous plastic, and which encompasses the microphone element (not shown). As can be seen from FIG. 13, the microphone is in position immediately forward of the motorcyclist's mouth. As illustrated in FIG. 13, the only portion of microphone mount 10 which extends below the bottom edge 76 of helmet 72 is that portion of microphone mount 10 containing the machine bolts which hold the mount in place. The bottom edge 76 of helmet 72 is approximately three-quarters of a circle and defines substantially a flat plane which, when the helmet is worn by an upright rider, substantially horizontal to the ground. Obviously discernible from FIGS. 13 and 14 is the fact that the longitudinal direction of the microphone boom seats are approximate parallel to the plane defined by the bottom edge of the helmet and that the microphone boom seat of the preferred embodiment is at right angles to the longitudinal direction of the upper jaw.

Immediately to the rear of microphone mount 10 is plug mount 40, plug mount 40 attached to the bottom edge 76 of helmet 72 as was microphone mount 10, and extending no further below helmet edge 76 than does microphone mount 10. Connected to microphone mount 10 by the electrical wire previously discussed, plug mount 40 has a female plug mounted in the plug opening which is in turn encompassed by an electrical male plug 79 attached to connecting wire 78 which is then connected with the selected audio instruments 75 mounted to the motorcycle, such as the two-way radio or stereo receiver or the like which are not shown. Further, wires 73 from plug mount 40 dive underneath the helmet's edge and run to the headset or earphones 71 (shown dotted) interiorly to the helmet.

FIG. 14 details use of the alternate embodiment of the Applicant's invention, namely microphone mount 60 which is adapted to receive the plastic microphone boom 80 rather than the flexible metal microphone boom 70 as shown in FIG. 13. Since the plastic microphone boom 80 is more susceptible to flexing with incoming wind than the steel microphone boom, the plastic microphone boom 80 is shorter and thus needed to be mounted closer to the rider's mouth. Like illustrated in FIG. 13, the microphone is held proximate the rider's mouth and covered with the same porous plastic wind sock 82. Because the microphone mount 60, to be closer to the rider's mouth, must be mounted on the curve portion of the helmet, the reason for skewing the microphone boom seat becomes apparent. The remainder of the helmet additions are the same, namely plug mount 40 is still connected to helmet 72 and connects with microphone mount 60 and interiorly located earphones by the originally previously discussed electrical wiring shown in connection with FIG. 13. Further, male plug 79 and connecting wire 78 connects with the female plug held by plug mount 40 and as previously discussed.

In the discussion above, the accessories or fixtures consisting of the microphone mount and the plug mount were discussed primarily in connection with application to a motorcyclist's helmet, however, it is readily apparent that the invention may be applied to helmets worn by persons in other professions, such as pilots, sports players, and parties that may be in noisy or contaminated environments.

In the invention, plastic has been incorporated to construct the elements with the exception of the machine bolts and nuts. Advantages in utilizing a resilient plastic is that the parts may be readily molded and, in case of an accident while the motorcyclist is riding, the lighter weight plastic presents a less dangerous flying object than a heavier metal part in the event the invention should break loose.

While a preferred embodiment together with an alternate embodiment of Applicant's invention has been shown and described, it is appreciated that other such embodiments of the invention are possible and that there is no intent to limit the invention by such disclosure, but rather it is intended to cover all modifications and alternate embodiments falling with the spirit and the scope of the invention as defined in the appended claims.

We claim:

1. Helmet accessories for helmets of the type having an opening for viewing and receiving the head of a wearer, the helmet opening having a lower side edge with adjacent inside and outside helmet surfaces above the lower side edge, said helmet accessories placing a microphone attached at the end of a boom proximate the helmet wearer's mouth, the accessories comprising:

a microphone mount for attachment to an associated helmet, said microphone mount adapted to receive and secure an associated microphone boom for placing the microphone proximate the wearer's mouth; and a plug mount for attachment to the associated helmet proximate said microphone mount, said plug mount adapted to receive and secure an associated electrical plug and provide for electrical connection from the electrical plug to the microphone secured by said microphone mount, to associated earphones located in the helmet, and to associated audio instruments located distal to the helmet;

both said microphone mount and said plug mount each including an attached clamp portion engaging the lower side edge of the associated helmet, said clamp portion comprising an outside elongated jaw and an inside elongated jaw, each said jaws having opposite first and second ends, each said outside jaw and inside jaw second ends forcibly engaging the outside surface and the inside surface of the helmet above the lower side edge of the helmet respectively with each said outside jaw and inside jaw first and below the side edge of the helmet, each said jaw defining an arcuate shaped concavity situated between said first and second end and a pair of gripping ridges in each of said concavity, and tightening means situated at said first end of each said jaws to force said jaws together, said tightening means comprising at least one machine bolt and nut, said machine bolt passing through said first ends of both said outside and inside jaw, said machine bolt and nut operably tightening said jaws forcibly together, said gripping ridges together with said second ends engaging and holding said clamp portion and thus said microphone mount and said plug mount to the helmet by tightening said jaws together whereby said microphone mount and plug mount secure the microphone in position and provide for electrical connections in order that the wearer may utilize the associated microphone, earphones, and audio instruments.

2. The helmet accessories as defined in claim 1 wherein said microphone mount includes a microphone boom seat attached to said outside jaw, said seat adapted to receive and secure the boom of a microphone, and to provide means for wires associated with the microphone to exit said seat.

3. The helmet accessories as defined in claim 2 wherein said microphone boom seat is attached to said outside jaw proximate said second end, said microphone boom seat thereby located proximate the outside surface of the helmet above the helmet edge.

4. The helmet accessories as defined in claim 3 wherein said microphone boom seat includes a removable top cap, said cap removable to facilitate placement of the microphone boom therein for securing, and to facilitate exiting the wires associated with the microphone from said seat.

5. The helmet accessories as defined in claim 4 wherein said microphone boom seat defines a separable elongated cylinder having a pair of oppositely situated circular openings, the first of said openings adapted to pass the microphone boom, and the second of said openings smaller than said first opening, said second opening comprising said means providing an exit for electrical wires connected to the microphone to exit from said seat, said second openings centrally situated with respect to said first opening.

6. The helmet accessories as defined in claim 1 wherein said plug mount includes a plug seat attached to said outside jaw, said plug seat adapted to receive and secure the associated electrical plug, and to provide means for wires associated with the electrical plug to exit said seat.

7. The helmet accessories as defined in claim 6 wherein said plug seat attached to said outside jaw comprises a plug seat attached to said outside jaw proximate said second end, said plug seat thereby located proximate the outside surface of the helmet above the helmet edge.

8. The helmet accessories as defined in claim 7 wherein said plug seat includes a removable top plug holder.

9. The helmet accessories as defined in claim 8 wherein said plug seat defines a cavity, said cavity adapted to receive the associated electrical plug.

10. The helmet accessories as defined in claim 9 wherein said plug mount defines a pair of openings, the first of said openings situated in said removable top plug holder, said first opening leading to said cavity in said plug mount, said first opening also adapted to receive the associated electrical plug in conjunction with said cavity, and said second opening partially in said removable top plug holder said second opening providing [an] *a means for wires associated with the electrical plug to* exit [for electrical wiring] into and out of said cavity formed in said plug mount.

11. The helmet accessories as defined in claim 10 wherein said plug mount first opening includes indexing grooves, said indexing grooves adapted to receive the associated electrical plug to secure the electrical plug in a fixed configuration.

12. The helmet accessories as defined in claim 5 wherein said microphone boom seat includes a plurality of circular grooves formed interiorly to said seat, said circular grooves adapted to receive and secure the microphone boom.

13. The helmet accessories as defined in claim 12 wherein said microphone boom seat elongated cylinder is situated at right angles to said outside elongated jaw.

14. The helmet accessories as defined in claim 12 wherein said microphone boom seat elongated cylinder is situated at an angle skewed from a right angle to said outside elongated jaw.

*15. An accessory mount for connection to a helmet having inner and outer surfaces and a bottom edge, said accessory mount comprising in combination:*

*(a) gripping means for engaging the inner and outer surfaces of said helmet above the bottom edge, the gripping means including a fulcrum located below the bottom edge;*

*(b) a microphone boom having first and second ends;*

*(c) an electronic microphone connected to the first end of said microphone boom;*

*(d) means for attaching the second end of said microphone boom to said gripping means above said fulcrum and for supporting said microphone in proximity to the mouth of a person wearing said helmet;*

*(e) means for attaching an electrical plug to said gripping means above said fulcrum;*

*(f) means for providing separate electrical connections between the electrical plug and (i) said microphone, (ii) at least one speaker in audio communication with the inner portion of the helmet, and (iii) electronic equipment external to said helmet.*

*16. The accessory mount of claim 15 wherein the gripping means is detachable from the helmet, and further comprising tightening means located between said fulcrum and said bottom edge for closing said gripping means on said helmet.*

*17. A method for mounting accessories to a helmet having inner and outer surfaces and a bottom edge, said method including the interchangeable steps of:*

*(a) securing a fulcrum including gripping means to the helmet by engaging the inner and outer surfaces thereof so that the fulcrum is below the bottom edge;*

*(b) securing one end of a microphone boom to the gripping means above said fulcrum;*

*(c) supporting an electronic microphone at the opposite end of the microphone boom and in proximity to the mouth of a person wearing the helmet;*

*(d) securing an electrical plug to the gripping means above said fulcrum;*

*(e) providing separate electrical connections between the electrical plug and (i) the electronic microphone, (ii) at least one speaker in audio communication with the inside of the helmet, and (iii) electronic equipment external to the helmet.*

* * * * *